United States Patent
Jiang et al.

(10) Patent No.: US 11,263,223 B2
(45) Date of Patent: Mar. 1, 2022

(54) USING MACHINE LEARNING TO DETERMINE ELECTRONIC DOCUMENT SIMILARITY

(71) Applicant: INTERNATIONAL BUSINESS MACHINES CORPORATION, Armonk, NY (US)

(72) Inventors: Jian Min Jiang, Beijing (CN); En Liang Xu, Beijing (CN); Bibo Hao, Beijing (CN); Eryu Xia, Beijing (CN); Jing Li, Beijing (CN); Ke Wang, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 185 days.

(21) Appl. No.: 16/168,129

(22) Filed: Oct. 23, 2018

(65) Prior Publication Data
US 2020/0125648 A1    Apr. 23, 2020

(51) Int. Cl.
*G06F 16/2457*    (2019.01)
*G06N 5/02*    (2006.01)
*G06N 20/00*    (2019.01)
*G06F 16/28*    (2019.01)

(52) U.S. Cl.
CPC ...... *G06F 16/24578* (2019.01); *G06F 16/285* (2019.01); *G06N 5/022* (2013.01); *G06N 20/00* (2019.01)

(58) Field of Classification Search
CPC .. G06F 16/24578; G06F 16/285; G06F 16/93; G06N 5/022; G06N 20/00; G06N 3/08
See application file for complete search history.

(56) References Cited

U.S. PATENT DOCUMENTS

| | | | |
|---|---|---|---|
| 9,892,111 B2 | 2/2018 | Danielyan et al. | |
| 2007/0196032 A1* | 8/2007 | Hovden | G06K 9/6215 |
| | | | 382/305 |
| 2015/0169758 A1 | 6/2015 | Assom et al. | |

(Continued)

OTHER PUBLICATIONS

A. Ahmad, M. Ruhul Amin and F. Chowdhury, "Bengali Document Clustering Using Word Movers Distance," 2018 International Conference on Bangla Speech and Language Processing (ICBSLP), Sylhet, Bangladesh, 2018, pp. 1-6, doi: 10.1109/ICBSLP.2018.8554598.*

(Continued)

*Primary Examiner* — Mark D Featherstone
*Assistant Examiner* — Samuel C Sharpless, III
(74) *Attorney, Agent, or Firm* — Tutunjian & Bitetto, P.C.; Joseph Petrokaitis (57) ABSTRACT

Methods and systems for using machine learning to determine electronic document similarity include extracting entities and corresponding relationships from each of two electronic documents of a corpus of electronic documents based on word embedding, computing an entity distance between the extracted entities and a relationship distance between the extracted relationships based on knowledge graph embedding, combining the entity and relationship distances to generate a similarity score between the electronic documents, and implementing the similarity score to perform a task associated with the electronic documents.

20 Claims, 5 Drawing Sheets

(56) References Cited

U.S. PATENT DOCUMENTS

| | | | | |
|---|---|---|---|---|
| 2016/0224547 | A1* | 8/2016 | Agrawal | G06F 16/93 |
| 2016/0350283 | A1* | 12/2016 | Carus | G06F 40/30 |
| 2016/0357855 | A1* | 12/2016 | Fan | G06F 16/313 |
| 2017/0132730 | A1* | 5/2017 | Takuma | G06F 16/93 |
| 2018/0032897 | A1 | 2/2018 | Cao et al. | |
| 2018/0039620 | A1* | 2/2018 | Ciulla | G06F 16/9024 |
| 2018/0197089 | A1* | 7/2018 | Krasser | H04L 41/145 |
| 2018/0341863 | A1* | 11/2018 | Ding | G06F 16/2237 |
| 2020/0042211 | A1* | 2/2020 | Rogulenko | G06F 9/5016 |

OTHER PUBLICATIONS

L. Stanchev, "Semantic search using a similarity graph," Proceedings of the 2015 IEEE 9th International Conference on Semantic Computing (IEEE ICSC 2015), 2015, pp. 93-100, doi: 10.1109/ICOSC.2015.7050785.*

I. Yoo and X. Hu, "Clustering Ontology-enriched Graph Representation for Biomedical Documents based on Scale-Free Network Theory," 2006 3rd International IEEE Conference Intelligent Systems, 2006, pp. 851-858, doi: 10.1109/IS.2006.348532.*

Matt J. Kusner et al., From Word Embeddings To Document Distances, Proceedings of the 32nd International Conference on Machine Learning, Lille, France, Jul. 2015, pp. 1-10, vol. 37, JMLR: W&CP.

Xiaodan Zhang, et al., A Comparative Study of Ontology Based Term Similarity Measures on PubMed Document Clustering, International Conference on Database Systems for Advanced Applications, Advances in Databases: Concepts, Systems and Applications, DASFAA Apr. 2007, pp. 115-126, vol. 4443.

Xiaodan Zhang, et al., Medical Document Clustering Using Ontology-Based Term Similarity Measures, International Journal of Data Warehousing and Mining (IJDWM) 4(1), pp. 62-73, Jan.-Mar. 2008, IGI Global.

* cited by examiner

USING MACHINE LEARNING TO DETERMINE ELECTRONIC DOCUMENT SIMILARITY

BACKGROUND

Technical Field

The present invention generally relates to artificial intelligence and machine learning, and more particularly to using machine learning to determine electronic document similarity.

Description of the Related Art

Generally, two electronic documents are similar if they contain at least some of the same terms. Electronic document similarity has many real-world applications in the field of information retrieval technology. For example, electronic document similarity can be used to, e.g., cluster electronic documents for classifying the electronic documents into different electronic folders or directories for quick review, search for electronic documents in response to receiving search queries, perform electronic document de-duplication to improve data storage and efficiency, and/or provide an electronic document answer in response receiving a question query associated with a question-answering system.

SUMMARY

In accordance with an embodiment of the present invention, a computer-implemented method for using machine learning to determine electronic document similarity is provided. The method includes extracting entities and corresponding relationships from each of two electronic documents of a corpus of electronic documents based on word embedding, computing an entity distance between the extracted entities and a relationship distance between the extracted relationships based on knowledge graph embedding, combining the entity and relationship distances to generate a similarity score between the electronic documents, and implementing the similarity score to perform a task associated with the electronic documents.

In accordance with another embodiment of the present invention, a system for using machine learning to determine electronic document similarity is provided. The system includes a memory device for storing program code and at least one processor device operatively coupled to the memory device. The at least one processor device is configured to execute program code stored on the memory device to extract entities and corresponding relationships from each of two electronic documents of a corpus of electronic documents based on word embedding, compute an entity distance between the extracted entities and a relationship distance between the extracted relationships based on knowledge graph embedding, combine the entity and relationship distances to generate a similarity score between the electronic documents, and implement the similarity score to perform a task associated with the electronic documents.

In accordance with yet another embodiment of the present invention, a computer program product is provided. The computer program product includes a non-transitory computer readable storage medium having program code embodied therewith. The program code is executable by a computer to cause the computer to perform a method for using machine learning to determine electronic document similarity. The method performed by the computer includes extracting entities and corresponding relationships from each of two electronic documents of a corpus of electronic documents based on word embedding, computing an entity distance between the extracted entities and a relationship distance between the extracted relationships based on knowledge graph embedding, combining the entity and relationship distances to generate a similarity score between the electronic documents, and implementing the similarity score to perform a task associated with the electronic documents.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The embodiments described herein can improve the efficiency in using machine learning to determine electronic document similarity (e.g., electronic medical document similarity), and thus improve the ability of a processor to implement electronic document similarity in one or more actions. For example, instead of determining a distance (e.g., earth mover's distance (EMD)) between two electronic documents in a corpus of electronic documents, which can be time consuming and computationally inefficient, distances between entities and relationships can be computed and combined to determine electronic document similarity.

The entities and relationships can be extracted from the two electronic documents using knowledge graph embedding, an entity distance between the extracted entities and a relationship distance between the extracted relationships can be computed (e.g., by computing the EMD between the extracted entities and relationships), and the entity distance and the relationship distance can be combined to determine the electronic document similarity (e.g., by combining the entity distance and the relationship distance as a weighted sum). The embodiments described herein reduce the amount of processing time and/or resources for determining electronic document distance as compared to machine learning processes that determine electronic document similarity based on distances computed over entire electronic documents. Additionally, the embodiments described herein can determine electronic document distance based on similarity without the use of domain knowledge.

Figure 1:
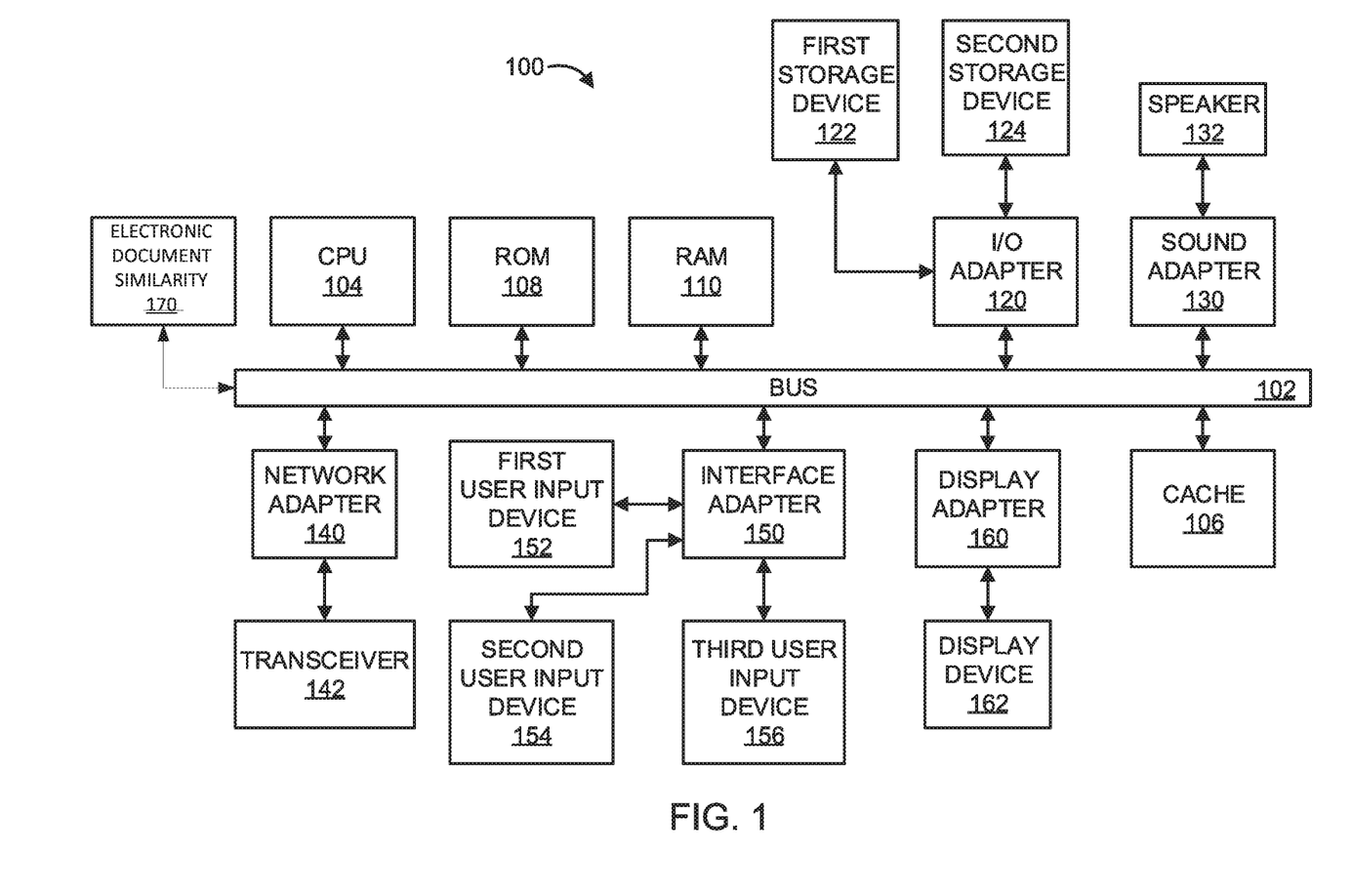
FIG. 1 is a block diagram of a processing system in accordance with an embodiment of the present invention.

Referring now to the drawings in which like numerals represent the same or similar elements and initially to FIG. 1, an exemplary processing system 100 to which the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Electronic document similarity component 170 may be operatively coupled to system bus 102. Electronic document similarity component 170 is configured to perform one or more of the operations described below. Electronic document similarity component 170 can be implemented as a standalone special purpose hardware device, or may be implemented as software stored on a storage device. In the embodiment in which electronic document similarity component 170 is software-implemented, although shown as a separate component of the computer system 100, electronic document similarity component 170 can be stored on, e.g., the first storage device 122 and/or the second storage device 124. Alternatively, electronic document similarity component 170 can be stored on a separate storage device (not shown).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
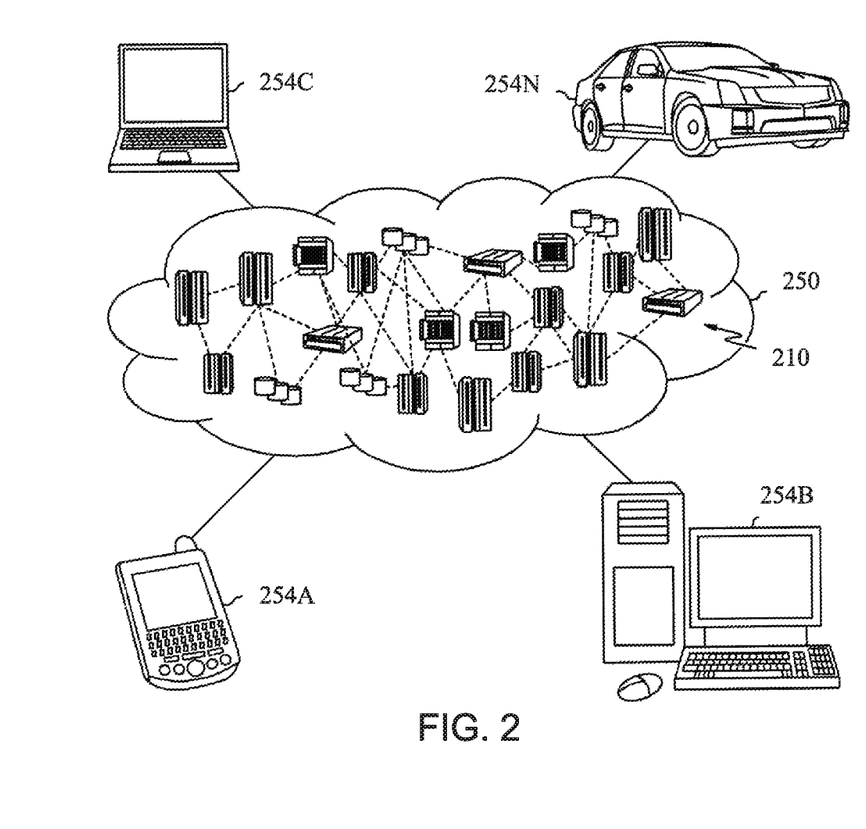
FIG. 2 is a block diagram showing an illustrative cloud computing environment having one or more cloud computing nodes with which local computing devices used by cloud consumers communicate in accordance with an embodiment.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
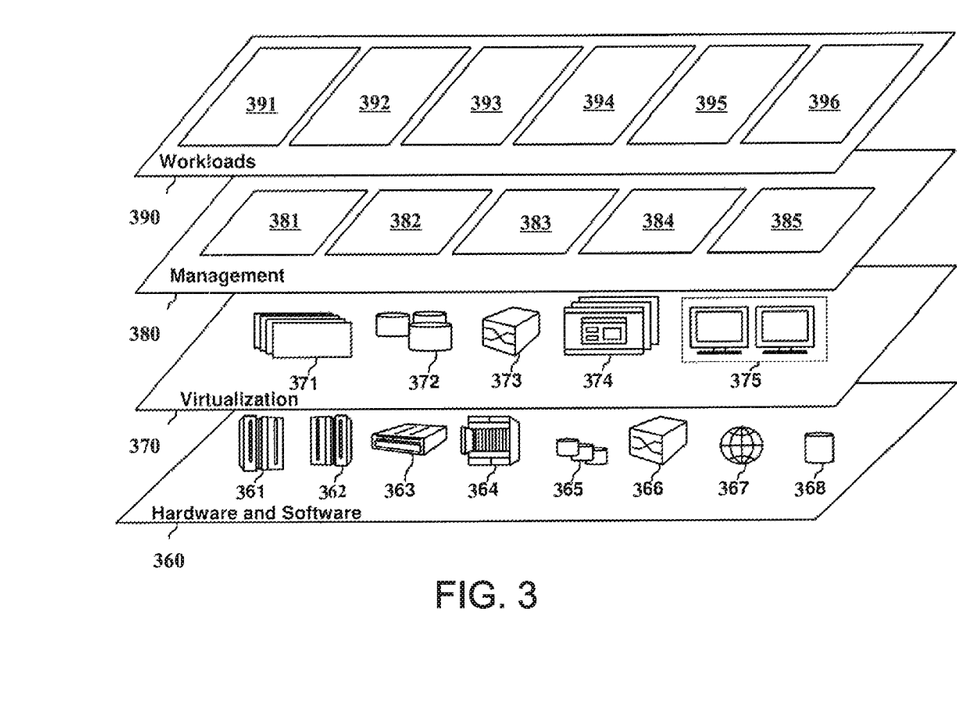
FIG. 3 is a block diagram showing a set of functional abstraction layers provided by a cloud computing environment in accordance with one embodiment.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and machine learning 396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
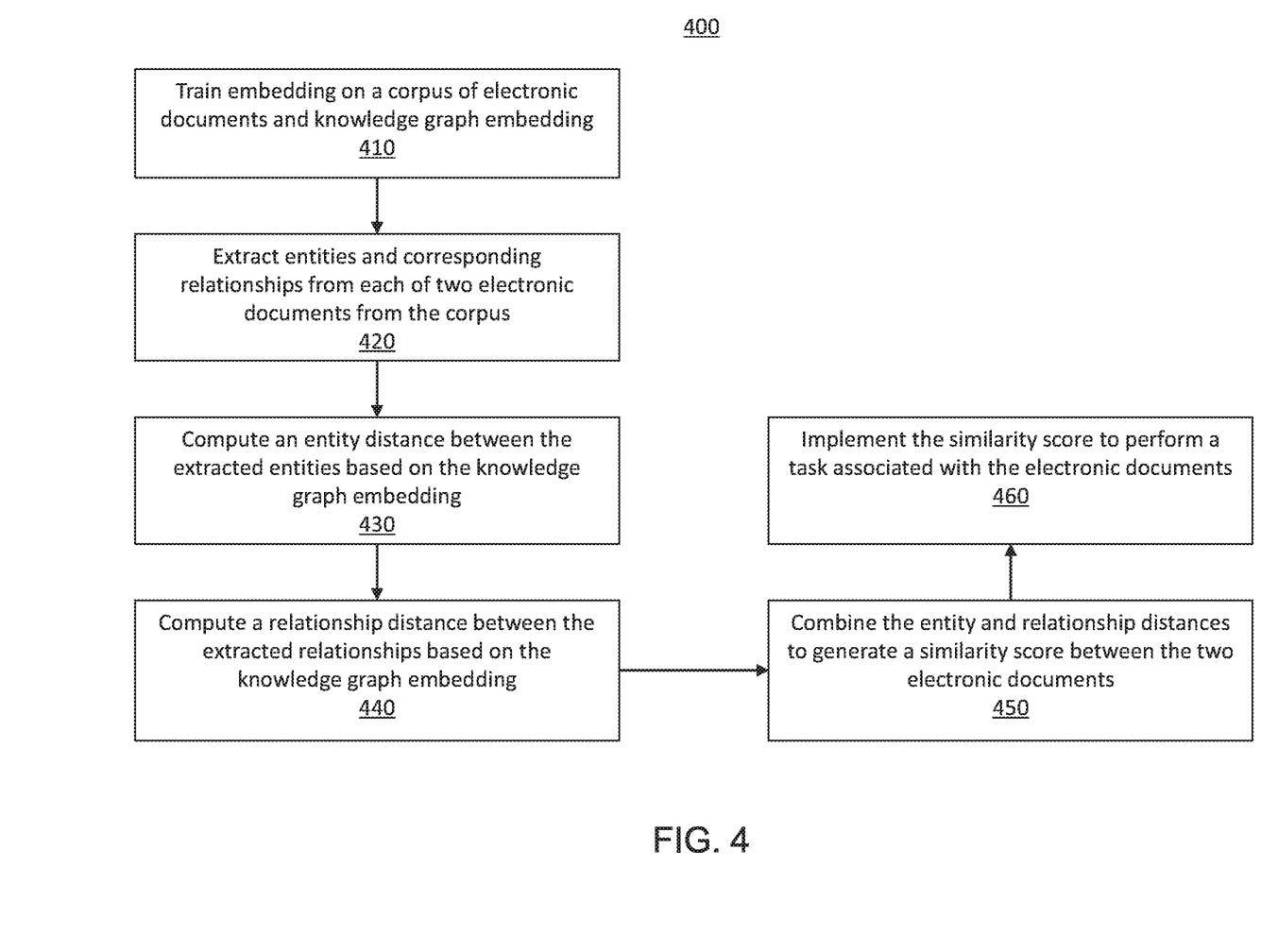
FIG. 4 is a block/flow diagram showing a system/method for using machine learning to determine electronic document similarity, in accordance with an embodiment of the present invention.

With reference to FIG. 4, a block/flow diagram is provided illustrating an overview of a system/method 400 for using machine learning to determine electronic document similarity, in accordance with an embodiment of the present invention.

At block 410, word embedding on a corpus of electronic documents, a knowledge graph and knowledge graph embedding are trained. In one embodiment, the corpus includes a medical corpus of electronic medical documents. However, the similarity between any type of electronic documents can be determined in accordance with the embodiments described herein.

As used herein, the term "word embedding" refers to language modeling and feature learning techniques used in machine learning and natural language processing (NLP) to map or project a representation of an electronic document (e.g., words and/or phrases of the electronic document) to a more convenient representation (e.g., vectors in a vector space). For example, embedding can map words and/or phrases from a representation space including, e.g., one dimension per word, to a lower dimensional vector space relative to the vocabulary size for representing the electronic document. By reducing the dimensionality of the space, using embedding techniques can improve the ability of a processor to determine electronic document similarity in accordance with the embodiments described herein.

A knowledge graph is a network of entities and their relationships, where nodes of the knowledge graph correspond to the entities and edges of the knowledge graph correspond to the relationships. A knowledge graph can include semantic types and properties associated with the entities. In the healthcare domain, the entities can include, e.g., diseases, drugs and symptoms, and the relationships can include, e.g., "is_kind_of," "treats," and "aggravates." For example, the entity "chronic cough" can have a relationship "is_kind_of cough," and the entity "aspirin" can have a relationship "treats hypertension." Knowledge graph embedding can be performed to map the entities and relationships in the knowledge graph into vectors within a lower-dimensional space.

To reduce the computational costs of generating embeddings and thus determining electronic document similarity in accordance with the embodiments described herein, one or more of the embeddings can include offline trained or pretrained word embeddings.

At block 420, entities and corresponding relationships are extracted from each of two electronic documents of the corpus. For example, in the following illustrative sentence found in an electronic document, "Drug_X would be the first drug of its kind to orally treat Disease_Y," the terms "Drug_X" and "Disease_Y" can be extracted as the entities, and the term "treats" can be extracted as the relationship between "Drug_X" and "Disease_Y."

In one embodiment, a rule-based information extraction method can be used to extract the entities and relationships from the electronic documents. For example, if the terms are in a disease dictionary, the entities can be extracted as diseases, while if the terms are in a drug dictionary, the entities can be extracted as drugs. In another embodiment, deep learning can be used to extract the entities and relationships from the electronic documents. In deep learning, architectures such as, e.g., deep neural networks can be applied, which can include multiple layers of nonlinear processing units to perform feature extraction and transformation. Deep learning architectures can implement, e.g., supervised, unsupervised and/or semi-supervised learning.

Using the knowledge graph embedding, the entities can be mapped into m-dimensional vectors and the relationships can be mapped into n-dimensional vectors. Using this embedding, a distance (e.g., Euclidean distance) between two entities in the corresponding vector space can be interpreted as a "travel cost." The travel cost between the two entities can be used to identify a distance between the two electronic documents in order to determine a similarity between the two electronic documents.

At block 430, an entity distance between the extracted entities is computed based on the knowledge graph embedding. To minimize computational costs of computing the entity distance, and therefore improve the ability of a processor to determine electronic document similarity in accordance with the embodiments described herein, computing the entity distance can include computing the entity distance based on Earth Mover's Distance (EMD). The EMD can measure a similarity between electronic documents as a minimum amount of distance that the embedded words of one of the electronic documents need to travel to reach the embedded words of the other one of the electronic documents.

For example, let $d_1$ and $d_2$ represent two electronic documents having a similarity being determined. The entities of document $d_1$ can be transformed into ones in document $d_2$. For an entity $x_i$ in document $d_1$, where i=1, 2, ... m, let $T_{ij}$ represent a nonnegative entry in an m×n flow matrix T representing how much of an entity $x_i$ travels to an entity $x_j$ in $d_2$, where j=1, 2, ... n. The entity distance can be defined as the minimum cumulative cost required to move all entities from $d_1$ to $d_2$. For example, the entity distance can be calculated as a solution to a linear program:

$$\min_{T \geq 0} \sum_{i=1}^{m} \sum_{j=1}^{n} T_{ij} \times c(x_i, x_j)$$

where $c(x_i, x_j)$ is a metric (e.g., Euclidean distance) between entities $x_i$ and $x_j$ (in the corresponding vector space). It is noted that to ensure that the entire flow from entity $x_i$ equals $d_{1_i}$ and the entire flow to entity $x_j$ equals $d_{2_j}$, the linear program above can be subject to the constraints $\sum_{j=1}^{m} T_{ij} = d_{1_i}$ for each i, and $\sum_{i=1}^{m} T_{ij} = d_{2_j}$ for each j.

At block 440, a relationship distance between the extracted relationships is computed based on the knowledge graph embedding. Similar to the entity distance, to minimize computational costs of computing the relationship distance, and therefore improve the ability of a processor to determine electronic document similarity in accordance with the embodiments described herein, computing the entity distance can include computing the entity distance based on EMD.

For example, the relationships of document $d_1$ can be transformed into ones in document $d_2$. For a relationship $y_i$ in document $d_1$, where i=1, 2, ... m, let $T_{ij}$ represent a nonnegative entry in an m×n flow matrix T representing how much of a relationship $y_i$ travels to a relationship $y_j$ in $d_2$, where j=1, 2, ... n. The relationship distance can be defined as the minimum cumulative cost required to move all relationships from $d_1$ to $d_2$. For example, the relationship distance can be calculated as a solution to a linear program:

$$\min_{T \geq 0} \sum_{i=1}^{m} \sum_{j=1}^{n} T_{ij} \times c(y_i, y_j)$$

where $c(y_i, y_j)$ is a metric (e.g., Euclidean distance) between relationships $y_i$ and $y_j$ (in the corresponding vector space). It is noted that to ensure that the entire flow from relationship $y_i$ equals $d_{1_i}$ and the entire flow to relationship $y_j$ equals $d_{2_j}$, the linear program above can be subject to the constraints $\Sigma_{j=1}^{n} T_{ij} = d_{1_i}$ for each i, and $\Sigma_{i=1}^{m} T_{i,j} = d_{2_j}$ for each j.

At block 450, the entity and relationship distances are combined to generate a similarity score between the electronic documents. In one embodiment, the entity and relationship distances can be combined as a weighted sum. For example, if the weight corresponding to the entity distance is 0.4 and the weight corresponding to the relationship distance is 0.6, the similarity score can be equal to 0.4×[entity distance]+0.6×[relationship distance].

At block 460, the similarity score is implemented to perform a task associated with the electronic documents. In one embodiment, the task can include clustering electronic documents to classify different types of electronic documents into different electronic folders and/or directories for quick review. For example, the action can include clustering medical electronic documents.

In another embodiment, the task can include performing a search for electronic documents in response to receiving a search query. For example, when a user submits a search query for electronic documents, the results can include electronic document(s) or a recommendation of electronic document(s) determined to be similar in accordance with the embodiments described herein. For example, the action can include performing a search for medical electronic documents in response to receiving a search query for medical electronic documents.

In yet another embodiment, the task can include performing electronic document de-duplication in a domain to improve data storage and efficiency. For example, the action can include performing electronic document de-duplication in a medical or bioinformatics domain to improve data storage and efficiency.

In yet another embodiment, the task can include providing an electronic document answer in response to receiving a question query associated with a question-answering system (e.g., a medical question-answering system).

A use-case example of using machine learning to determine electronic document similarity will now be described with reference to FIG. 5.

Figure 5:
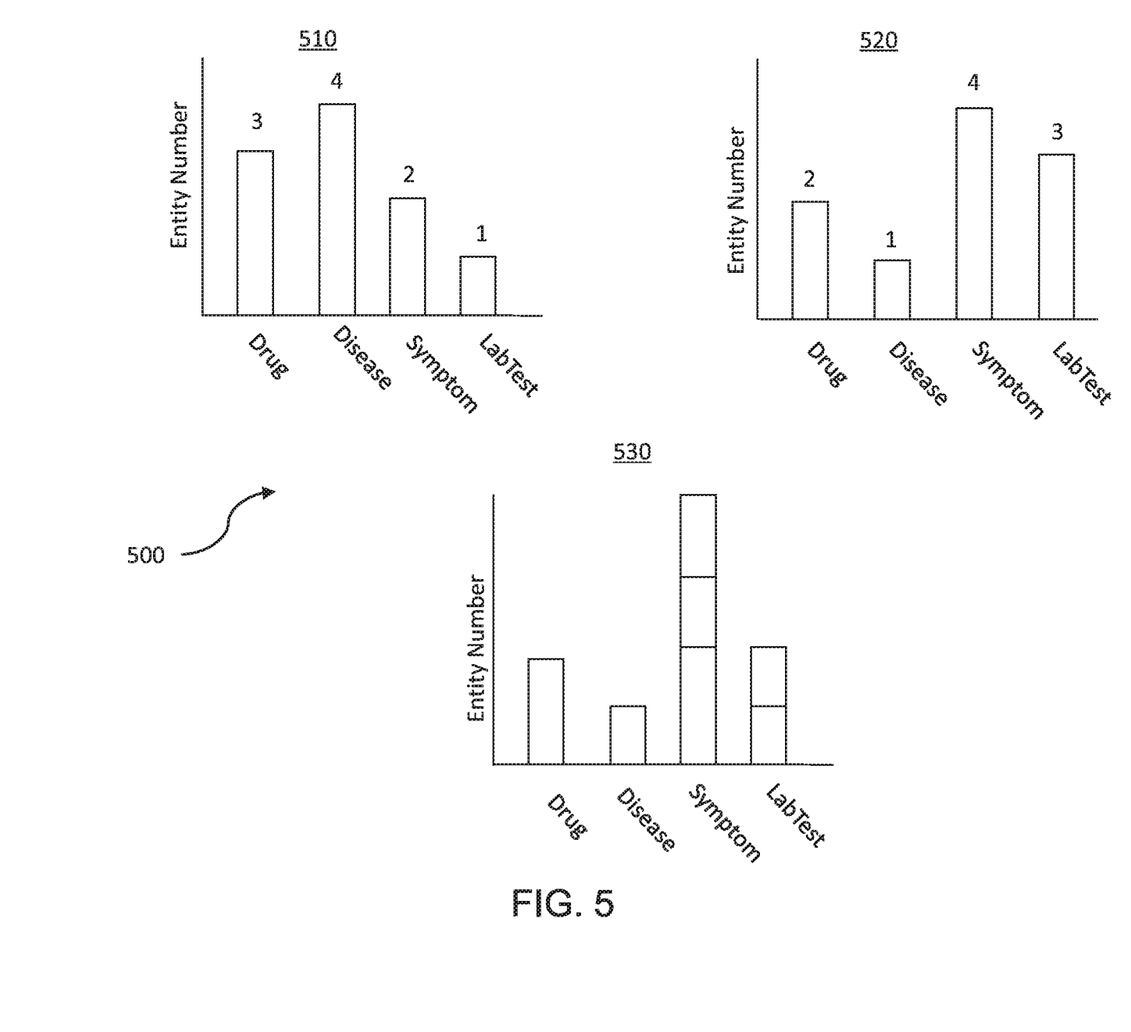
FIG. 5 is a diagram showing a method for using machine learning to determine electronic document similarity, in accordance with an embodiment of the present invention.

With reference to FIG. 5, a set of histograms 500 are provided. In this illustrative embodiment, the values are normalized so that the values of each histogram sum to 10. Additionally, the electronic documents in this illustrative example include medical documents.

As shown, the set of histograms 500 include a histogram 510 representing a distribution of entities in a medical document $d_1$, a histogram 520 representing a distribution of entities in a medical document $d_2$. As shown, the entities include "drug," "disease," "symptom," and "LabTest." To determine the distance (e.g., EMD) between $d_1$ and $d_2$, the minimum work to transform $d_1$ to $d_2$ can be identified. For example, an exemplary cost matrix C is provided below in Table 1, where indices 1, 2, 3 and 4 denote the entities "drug," "disease," "symptom," and "LabTest," respectively:

TABLE 1

|   | d1$_1$ | d1$_2$ | d1$_3$ | d1$_4$ |
|---|---|---|---|---|
| d2$_1$ | 0 | 0.8 | 0.1 | 0.7 |
| d2$_2$ | 0.8 | 0 | 0.6 | 0.8 |
| d2$_3$ | 0.1 | 0.6 | 0 | 0.3 |
| d2$_4$ | 0.7 | 0.8 | 0.3 | 0 |

The set of histograms 500 further includes a histogram 530 representing a distribution of the distance between the medical documents $d_1$ and $d_2$. Histogram 530 illustrates a "best" transformation of $d_1$ to $d_2$ based on the total cost among all feasible transformations. For example, if there are 3 units of the entity "drug" in $d_2$, then $T_{1,1}=2$ units can be moved to d1's Drug (with cost $2 \times C_{1,1} = 2 \times 0 = 0$) and $T_{1,3}=1$ unit is moved to $d_1$'s symptom entity (with cost $1 \times C_{1,3} = 1 \times 0.1 = 0.1$). Based on this transformation, the distance between $d_1$ and $d_2$ equals 0.1+2.4+0+0=2.5, providing a quantitative measure for the dissimilarity between $d_1$ and $d_2$.

Having described preferred embodiments of a system and method for determining electronic document similarity (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for using machine learning to determine electronic document similarity, comprising:

extracting a set of entities being medical terms and corresponding relationships from each of a first and second electronic document of a corpus of electronic documents based on word embedding, the set of entities being a subset of all the medical entities found within the first and second electronic documents;

computing an entity distance between the entities and a relationship distance between the relationships based on knowledge graph embedding, the entity distance and the relationship distance representing fewer distances of a total number of distances between the first and second documents, and the knowledge graph embedding mapping the entities and relationships in a knowledge graph to a lower dimensional vector space, the entity distance defined as a minimum cumulative cost to move all the subset of medical entities from the first electronic document to the second electronic document;

combining the entity distance and the relationship distance to generate a similarity score between the first and second electronic documents from the subset of medical entities, the similarity score further based on the fewer distances of the total number of distances between the first and second electronic documents; and implementing the similarity score to perform a clustering and a de-duplication task associated with the subset of medical entities found in the first and second electronic documents.

2. The method of claim 1, wherein the entity distance is calculated as a solution to a linear program from:

$$\min_{T \geq 0} \sum_{i=1}^{m} \sum_{j=1}^{n} T_{ij} \times c(x_i, x_j)$$

where $c(x_i, x_j)$ is a metric between entities $x_i$ and $x_j$ in a corresponding vector space.

3. The method of claim 2, wherein the linear program is subject to constraints $\Sigma_{j=1}^{n} T_{ij} = d_{1_i}$ for each i, and $\Sigma_{i=1}^{m} T_{ij} = d_{2_j}$ for each j.

4. The method of claim 1, wherein extracting the entities and relationships further includes extracting the entities and relationships using a deep learning method.

5. The method of claim 1, wherein the first and second electronic documents are medical documents.

6. The method of claim 1, wherein combining the entity and relationship distances to generate the similarity score further includes combining the entity and relationship distances to generate the similarity score as a weighted sum.

7. The method of claim 1, wherein implementing the similarity score further includes performing at least one action selected from the group consisting of:
 a search for electronic documents based on the similarity score in response to receiving a search query; and
 an electronic document answer provision based on the similarity score in response to receiving a question query associated with a question-answering system.

8. A system for using machine learning to determine electronic document similarity, comprising:
 a memory device for storing program code; and
 at least one processor device operatively coupled to the memory device and configured to execute program code stored on the memory device to:
  extract a set of entities being medical terms and corresponding relationships from each of a first and second electronic document of a corpus of electronic documents based on word embedding, the set of entities being a subset of all the medical entities found within the first and second electronic documents;
  compute an entity distance between the entities and a relationship distance between the relationships based on knowledge graph embedding, the entity distance and the relationship distance representing fewer distances than a total number of distances between the first and second documents, and the knowledge graph embedding mapping the entities and relationships in a knowledge graph to a lower dimensional vector space, the entity distance defined as a minimum cumulative cost to move all the subset of medical entities from the first electronic document to the second electronic document;
  combine the entity distance and the relationship distance to generate a similarity score between the first and second electronic documents from the subset of medical entities, the similarity score further based on the fewer distances of the total number of distances between the first and second electronic documents; and
  implement the similarity score to perform a clustering and a de-duplication task associated with the subset of medical entities found in the first and second electronic documents.

9. The system of claim 8, wherein the entity distance is calculated as a solution to a linear program from:

$$\min_{T \geq 0} \sum_{i=1}^{m} \sum_{j=1}^{n} T_{ij} \times c(x_i, x_j)$$

where $c(x_i, x_j)$ is a metric between entities $x_i$ and $x_j$ in a corresponding vector space.

10. The system of claim 9, wherein the linear program is subject to constraints $\Sigma_{j=1}^{n} T_{ij} = d_{1_i}$ for each i, and $\Sigma_{i=1}^{m} T_{ij} = d_{2_j}$ for each j.

11. The system of claim 8, wherein the first and second electronic documents are medical documents.

12. The system of claim 8, wherein the at least one processor is further configured to combine the entity and relationship distances to generate the similarity score by combining the entity and relationship distances to generate the similarity score as a weighted sum.

13. The system of claim 8, wherein the at least one processor is further configured to implement the similarity score by performing at least one action selected from the group consisting of:
 a search for electronic documents based on the similarity score in response to receiving a search query; and
 an electronic document answer provision based on the similarity score in response to receipt of a question query associated with a question-answering system.

14. A computer program product comprising a non-transitory computer readable storage medium having program code embodied therewith, the program code executable by a computer to cause the computer to perform a method for using machine learning to determine electronic document similarity, the method performed by the computer comprising each of the steps of:
 extracting a set of entities being medical terms and corresponding relationships from each of a first and second electronic document of a corpus of electronic documents based on word embedding, the set of entities being a subset of all the medical entities found within the first and second electronic documents;
 computing an entity distance between the entities and a relationship distance between the relationships based on knowledge graph embedding, the entity distance and the relationship distance representing fewer distances of a total number of distances between the first and second documents, and the knowledge graph embedding mapping the entities and relationships in a knowledge graph to a lower dimensional vector space, the entity distance defined as a minimum cumulative cost to move all the subset of medical entities from the first electronic document to the second electronic document;
 combining the entity distance and the relationship distance to generate a similarity score between the first and second electronic documents from the subset of medical entities, the similarity score further based on the fewer distances of the total number of distances between the first and second electronic documents; and
 implementing the similarity score to perform a clustering and a de-duplication task associated with the subset of medical entities found in the first and second electronic documents.

15. The computer program product of claim 14, wherein the entity distance is calculated as a solution to a linear program from:

$$\min_{T \geq 0} \sum_{i=1}^{m} \sum_{j=1}^{n} T_{ij} \times c(x_i, x_j)$$

where $c(x_i, x_j)$ is a metric between entities $x_i$ and $x_j$ in a corresponding vector space.

16. The computer program product of claim 15, wherein the linear program is subject to constraints $\Sigma_{j=1}^{n} T_{ij} = d_{1_i}$ for each i, and $\Sigma_{i=1}^{m} T_{ij} = d_{2_j}$ for each j.

17. The computer program product of claim 14, wherein extracting the entities and relationships further includes extracting the entities and relationships using a deep learning method.

18. The computer program product of claim 14, wherein the first and second electronic documents are medical documents.

19. The computer program product of claim 14, wherein combining the entity and relationship distances to generate the similarity score further includes combining the entity and relationship distances to generate the similarity score as a weighted sum.

20. The computer program product of claim 14, wherein implementing the similarity score further includes performing at least one action selected from the group consisting of:
   a search for electronic documents based on the similarity score in response to receiving a search query;
   and
   an electronic document answer provision based on the similarity score in response to receiving a question query associated with a question-answering system.

\* \* \* \* \*